(12) United States Patent
Veeraraghavan et al.

(10) Patent No.: US 8,811,767 B2
(45) Date of Patent: Aug. 19, 2014

(54) STRUCTURED LIGHT FOR 3D SHAPE RECONSTRUCTION SUBJECT TO GLOBAL ILLUMINATION

(75) Inventors: Ashok Veeraraghavan, Cambridge, MA (US); Mohit Gupta, New York, NY (US); Amit Agrawal, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 387 days.

(21) Appl. No.: 13/048,019

(22) Filed: Mar. 15, 2011

(65) Prior Publication Data

US 2012/0237112 A1    Sep. 20, 2012

(51) Int. Cl.
*G06K 9/40* (2006.01)
*G06T 7/00* (2006.01)

(52) U.S. Cl.
CPC ..... *G06T 7/0057* (2013.01); *G06T 2207/10152* (2013.01); *G06T 2207/20221* (2013.01)
USPC ........... 382/268; 356/521; 356/601; 356/603; 356/610; 356/919; 382/106; 382/108; 382/154; 382/165; 382/286

(58) Field of Classification Search
None
See application file for complete search history.

(56) References Cited

U.S. PATENT DOCUMENTS

| | | | | |
|---|---|---|---|---|
| 5,636,025 A | * | 6/1997 | Bieman et al. | 356/619 |
| 5,835,218 A | * | 11/1998 | Harding | 356/521 |
| 5,878,152 A | * | 3/1999 | Sussman | 382/106 |
| 6,438,272 B1 | * | 8/2002 | Huang et al. | 382/286 |
| 6,493,095 B1 | * | 12/2002 | Song et al. | 356/603 |
| 7,545,516 B2 | * | 6/2009 | Jia et al. | 356/603 |
| 7,570,370 B2 | * | 8/2009 | Steinbichler et al. | 356/603 |
| 7,756,323 B2 | * | 7/2010 | Kimmel | 382/154 |
| 7,844,079 B2 | * | 11/2010 | Hassebrook et al. | 382/108 |
| 8,090,194 B2 | * | 1/2012 | Golrdon et al. | 382/154 |
| 2003/0160970 A1 | * | 8/2003 | Basu et al. | 356/601 |
| 2007/0165246 A1 | * | 7/2007 | Kimmel | 356/610 |
| 2008/0118143 A1 | * | 5/2008 | Gordon et al. | 382/154 |
| 2008/0279446 A1 | * | 11/2008 | Hassebrook et al. | 382/154 |
| 2009/0016572 A1 | * | 1/2009 | Hassebrook et al. | 382/106 |
| 2009/0238449 A1 | * | 9/2009 | Zhang et al. | 382/165 |

OTHER PUBLICATIONS

Mohit Gupta et al.: "Structured Light 3D Scanning in the Presence of Global Illumination," Computer Vision and Pattern Recognition (CVPR), 2011 IEEE Conference on, IEEE, Jun. 20, 2011, pp. 713-720, XP032037823.

Goddyn Luis, et al., "Binary Gray Codes with Long Bit Runs," Department of Mathematics, Simon Fraser University, Burnaby, BC, Canada; Submitted: Dec. 21, 2001; Accepted: Jun. 17, 2003; Published: Jun. 27. 2003.

\* cited by examiner

*Primary Examiner* — Tsung-Yin Tsai
(74) *Attorney, Agent, or Firm* — Dirk Brinkman; Gene Vinokur

(57) ABSTRACT

Depth values in a scene are measured by projecting sets of patterns on the scene, wherein each set of patterns is structured with different spatial frequency using different encoding functions. Sets of images of the scene is acquired, wherein there is one image for each pattern in each set. Depth values are determining for each pixel at corresponding locations in the sets of images. The depth values of each pixel are analyzed, and the depth value is returned if the depth values at the corresponding locations are similar. Otherwise, the depth value is marked as having an error.

19 Claims, 2 Drawing Sheets

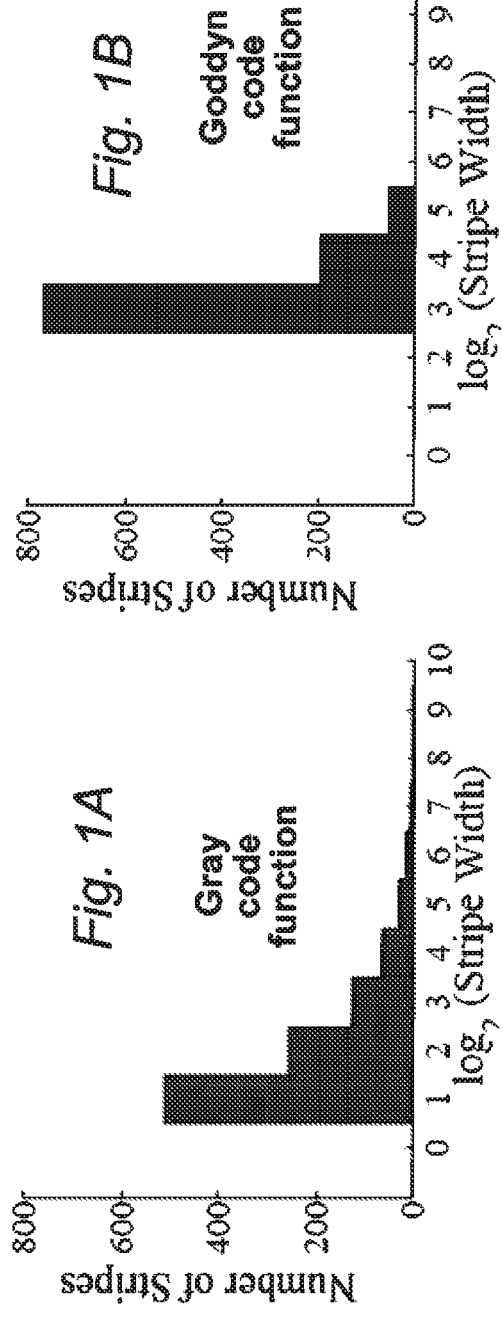
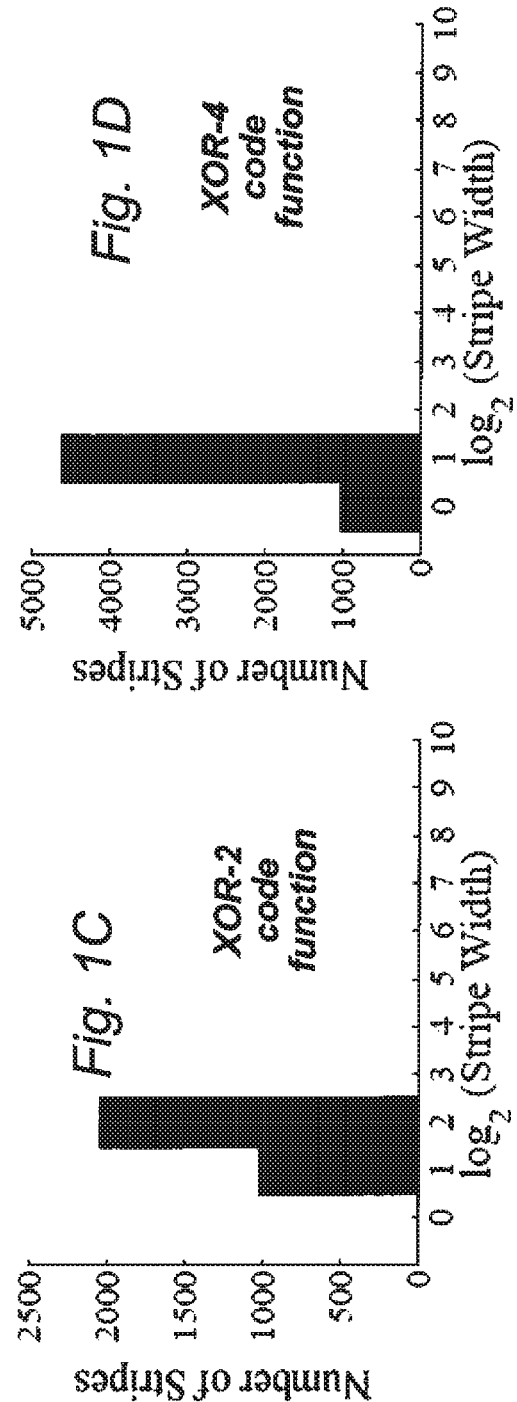

200

STRUCTURED LIGHT FOR 3D SHAPE RECONSTRUCTION SUBJECT TO GLOBAL ILLUMINATION

FIELD OF THE INVENTION

This invention relates generally to measuring depth values in scenes using structured light patterns, and more particularly to measuring shapes in scenes subject to global illumination.

BACKGROUND OF THE INVENTION

Structured light triangulation is a method of choice for measuring shape in applications, including industrial automation, computer graphics, virtual reality, robot-human interaction, medical surgery, and computer vision. The shapes are measured from depth values.

Work in this field has been driven by two factors: first, reducing acquisition time, and second, increasing depth resolution. Conventional methods can measure 3D shapes at close to 1000 Hz with a depth resolution of more than 30 microns.

Most structured light methods make an important assumption: a scene only receives illumination directly from a light source. This assumption can only be fulfilled in a controlled laboratory or studio setting. For most real world scenes, this is not true. In several applications, the scene receives a significant amount of indirect or global illumination in the form of inter-reflections, sub-surface scattering, volumetric scattering, diffusion), which often is more than the direct illumination.

Conventional structured light methods do not account for these global light transport effects, resulting in significant and systematic errors in recovering shapes from depth values. Moreover, because of the systematic nature of these errors, it is hard to correct the errors in post-processing. It is not surprising then that those methods have been used on relatively simple scenes, devoid of global light transport effects.

Historically, global illumination has not been modeled in computer vision applications because computational models for global illumination are complex, even for relatively simple scenes.

More recently, it has been shown that the direct and global components of illumination can be efficiently separated. This led to a number of methods for performing structured light based shape reconstruction under global light transport. All of those methods rely on removing or reducing the effects of global light transport, either by polarization, high-frequency modulation of structured light patterns, or iteratively reducing the total illumination in the scene. Because those methods rely on obtaining the direct component, errors occur when the separation methods do not work.

For instance, both polarization and modulated illumination based separation fail to filter high frequency inter-reflections. Moreover, in scenes where the direct component is relatively low, for example, with highly translucent materials, removing the global component can be counter-productive, resulting in significant errors due to low signal-to-noise-ratio (SNR). In addition, all those methods have a significant over-head in terms of hardware setup and acquisition time.

Shape Recovery Under Global Light Transport

In computer vision applications, an iterative photometric approach reconstructs shape of Lambertian objects in the presence of inter-reflections. Another method explicitly separates global component from images for performing photometric stereo imaging. Depths can be recovered using projector defocus under global illumination effects. Another method use inter-reflections to resolve a bas-relief ambiguity inherent in shape-from-shading techniques. An active multi-view stereo technique uses high-frequency illumination as scene texture that is invariant to global illumination. Another method moves the camera or the scene to reduce the effects of global light transport in a structured light application.

It is desired to provide a structured light method and systems with a single camera and a projector without any moving parts to reconstruct transparent, opaque and translucent surfaces as well as surfaces that result in global illumination effects, such as inter-reflections and sub-surface scattering.

SUMMARY OF THE INVENTION

In most computer vision applications, shape measuring methods that use structured light assume that a scene points is only directly illuminated by a light source. Consequently, global light transport (GLT) effects, such as inter-reflections, diffusion, subsurface and volumetric scattering and translucency severely degrade the performance of such methods.

The embodiments of our invention provide a method for measuring 3D shapes in an image acquired of a scene under global light transport. The shapes are measured from depth values in the scene. We analyze errors due to different modes of global light transport for structured light based depth recovery.

Based on this analysis, we identify the properties that structured light patterns must have to be resilient to these errors. These properties are based on the spatial frequencies of structured patterns projected onto the scene.

We provide multiple sets of structured illumination patterns that are resilient to errors caused by different light transport modes, and also optical artifacts such as defocus.

We provide methods for detecting residual errors and correcting the errors by acquiring a small number of additional images. Our methods do not require an explicitly separation of the global and direct components of illumination, as in the prior art. Consequently, we can handle a larger class of scenes, while requiring fewer images when compared to conventional explicit methods.

BRIEF DESCRIPTION OF THE DRAWINGS

FIGS. 1A-1D are histograms of projector stripe width as a function of number of stripes for sets of structured light patterns according to embodiments of the invention.

DETAILED DESCRIPTION OF THE PREFERRED EMBODIMENT

Figure 2:
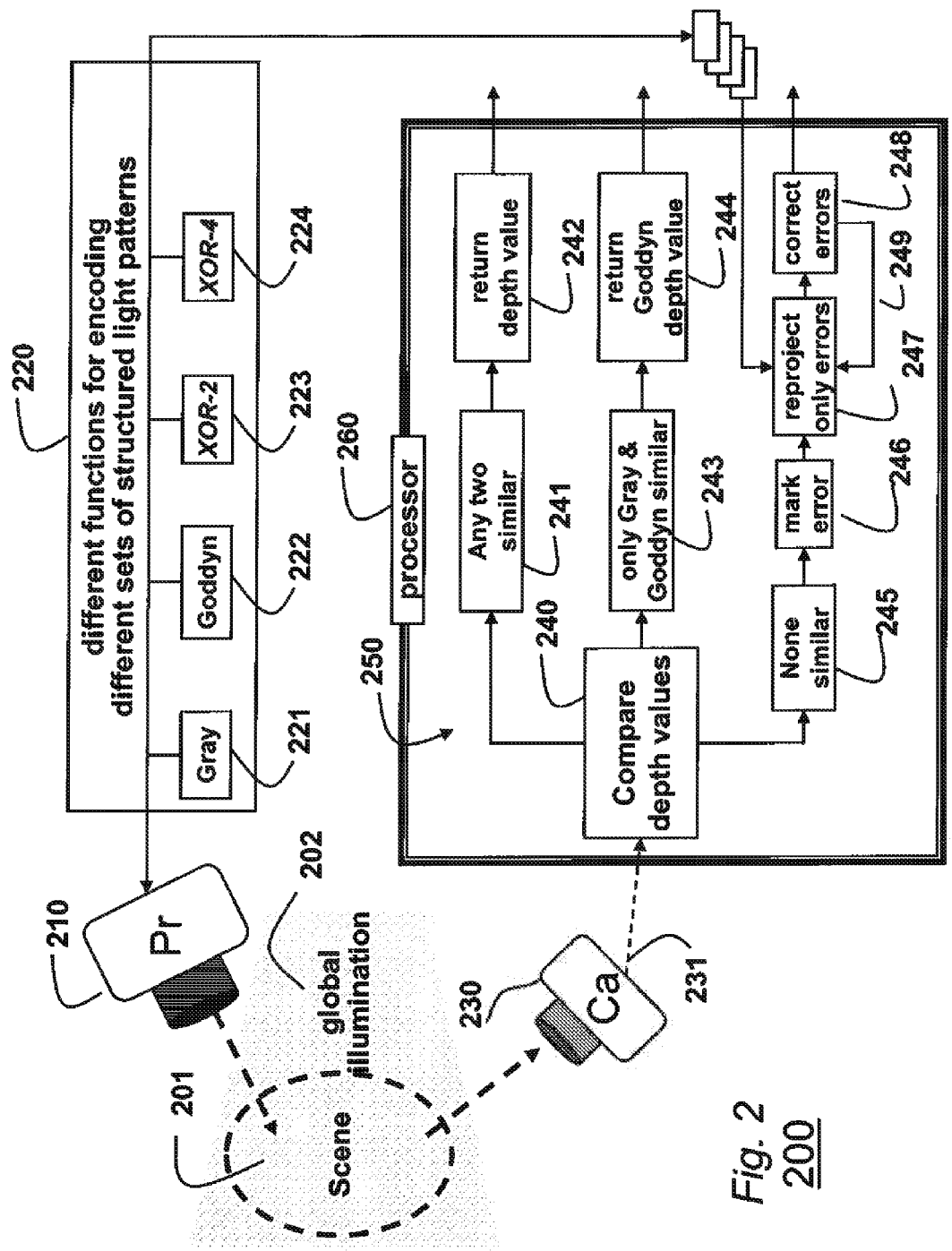
FIG. 2 is a schematic of a system and method for measuring depth values in a scene according to embodiments of the invention.

Error Analysis for Structured-Light Under Global Light Transport

The basic principle behind shape from structured light methods is triangulation. Each row and column of pixels in a projector is encoded with unique spatial or temporal codes to form structured light patterns. The projector illuminates the scene with the light pattern, while a camera acquires a sequence of images, one for each pattern.

For each pixel in the camera sensor, the corresponding row and column of the projector are determined by decoding measured intensity values. Then, depths are determined by triangulating camera rays and a projector plane. For correct decoding, it is assumed that each camera pixel receives irradiance from a single projector pixel.

However, in most real world scenes, the camera pixel can receive irradiance from multiple projector pixels due to global light transport effects, camera/projector defocus and optics artifacts, spatial misalignment of projector-camera pixels, and camera pixels that are larger than the projector pixels. In the following, we analyze the errors in the decoding process under the above described effects.

For simplicity, we described binary coding functions, although other coding functions are possible. For example, the analysis for N-ary discrete codes and continuous codes that use phase-shifting follows in a similar manner. For binary codes, $\log_2 N$ binary patterns are projected on the scene, where N is the number of projector columns and rows to be encoded. If point $S_i$ in a scene point is directly illuminated, the radiance at the point $S_i$ is:

$$L^i = L_d^i + \alpha L_g^i, \quad (1)$$

where $L_d^i$ and $L_g^i$ are the direct and global components of the radiance at $S_i$ when the scene is fully illuminated, $\alpha$ is a fraction of global component received at point $S_i$ under the projected pattern P.

As defined herein, a scene point corresponds to a pixel of an image sensor in a camera. Each scene point has an associated (x, y) location, and a z depth value. Hence, the scene points are three dimensional. The (x, y) locations simply correspond to pixel coordinates on the sensor. Our main concern is with the depth values z.

For accuracy, binary coded techniques project the pattern P and its inverse $\bar{P}$. The inverse pattern can be generated by subtracting the image from an image of the fully illuminated scene with an all white pattern. With the pattern P, the intensity at point $S_i$ is:

$$\bar{L}^i = (1-\alpha)L_g^i, \quad (2)$$

For correct decoding, the following condition must hold:

$$L^i > \bar{L}^i \quad (3)$$

$$\Rightarrow L_d^i + \alpha L_g^i > (1-\alpha)L_g^i. \quad (4)$$

Situations where Equation (4) does not Hold

For the most accurate decoding, when the point $S_i$ is directly illuminated, all other scene points contributing to the global component at the point $S_i$ are also directly illuminated. In this case, $\alpha=1$. Next, we consider scenarios where Eqn. (4) does not hold, resulting in systematic decoding errors.

Long Range Effects: Inter-Reflections and Diffusion

Inter-reflections (diffuse and specular) and diffusion tend to be long-range light transport effects. Under these conditions, a scene point can receive significant global illumination from points not in the local neighborhood. By using a high-frequency illumination pattern, for example, a pattern with half the pixels ON and the other half OFF, it is possible to ensure that $\alpha=0.5$.

However, most structured light patterns include a large range of frequencies. For example, conventional 10-bit Gray codes have 10 patterns (bit planes), where the spatial frequency doubles every pattern. Thus, conventional structure light patterns have both high frequency and low frequency patterns. For the low frequency patterns, it is possible that $\alpha \ll 1/2$, and that the inequality in Eqn. (4) does not hold. This results in a bit-decoding error. Because the low frequency patterns correspond to the most-significant bits, the decoding error is large.

It is also noted, that the single set of prior art patterns is encoded with a single function, and hence can only explore a single aspect of the illumination in the scene, for example, only direct illumination, and not other parts aspects of global illumination such as indirect illumination, inter-reflections, sub-surface scattering, and volumetric scattering, diffusion.

Local Effects: Sub-Surface Scattering

Sub-surface scattering results in low-pass filtering of the incident illumination. For structured light, sub-surface scattering can severely blur the high-frequency patterns, thus rendering the patterns undecodable. Higher frequency patterns correspond to the lesser significant bits. If these patterns cannot be decoded, there is a loss of depth resolution. If a size of the sub-surface scattering kernel is large, then the number of patterns that are lost is also large, and more the depth resolution is reduced. This can also be explained in terms of the inequality in Eqn. (4).

For translucent materials, the direct component is inversely proportional to the support of the sub-surface scattering kernel, the larger the kernel, the smaller the direct component. For high-frequency patterns, $\alpha \approx 0.5$ because $L_d^i \approx 0$, $L^i \approx \bar{L}^i$. Consequently, in the presence of noise, the pattern cannot be decoded correctly since the direct component $L_d^i$ is very small.

For low frequency patterns, $\alpha > 0.5$. In this case, the global component actually helps correct decoding. We exploit this observation for designing patterns that are decodable in the presence of sub-surface scattering.

Camera/Projector Defocus and Optics Artifacts

In the presence of defocus (projector or camera), the projected patterns and the acquired image is blurred. Similarly, projectors with imperfect optics also result in blurring of the projected patterns. For example, pico-projectors are increasingly popular for structured light applications in industrial assembly lines. However, due to imperfect optics, a striped pattern of 2-pixel width cannot be resolved.

Using the Gray codes, which have a Hamming distance of one between consecutive code-words gives resistance for up to 1 pixel blur. If the blur is larger, then the blur influences the highest frequency patterns, often completely blurring the patterns. Unlike sub-surface scattering, defocus modulates the direct component as well. The image intensities are given as:

$$L^i = \beta L_d^i + \alpha L_g^i + L_\alpha^i, \quad (5)$$

$$\bar{L}^i (1-\beta) L_d^i + (1-\alpha)L_g^i + L_\alpha^i \quad (6)$$

where $\beta$ is the fraction of direct component received in the presence of defocus. Under severe blur and for high frequency patterns, $\beta \approx 0.5$. For high-frequency patterns, because $\alpha \approx 0.5$, $L^i \approx \bar{L}^i$, and the bits corresponding to these patterns can not be resolved. As before, this results in loss of depth resolution.

Designing Codes Resilient to Global Light Transport

The sources of errors described above impose contrasting requirements on the projected codes. For long range effects, patterns with low frequencies result in decoding errors. For local effects, such as defocus and subsurface scattering, high-frequency patterns are blurred, and cannot be decoded. We design codes that are resilient to errors resulting due to each class of effects.

Histogram of Stripe Widths (Run-Lengths) for Different Codes

FIG. 1A-1D shows histograms of projector $\log_2$ stripe widths as a function of number of stripes for sets of structured light patterns according to embodiments of the invention. The Gray code stripe widths in FIG. 1A range from 2 to 512 pixels. FIG. 1B shows Goddyn codes. Because the lowest stripe-width of these codes is high, these codes are resilient to local effects. FIGS. 1C and 1D show logical exclusive OR codes Gray codes (XOR-02 and XOR-01 as described below) optimized for long range inter-reflections. In this case, all the stripe widths are relative small.

Logical Coding for Long Range Effects

For resilience against long range global light transport effects, we use coding functions that do not have low frequency patterns. But low-frequency patterns form an integral part of all conventional coding schemes. For the conventional Gray codes in FIG. 1A, the low frequency patterns provide the more significant bits. In phase-shifting, the low-frequency patterns are required for phase unwrapping. Errors made in decoding the low-frequency patterns have a much more severe impact on the final decoding result as compared to an error made in decoding high-frequency patterns.

Correct decoding can be achieved by separately determining only the direct component of the images acquired under these patterns. However, this separation is not always possible. The key insight is that the direct component is just an intermediate representation.

For binary codes, we project sets of binary patterns on the scene. We are interested in a binary classification of the scene points, which are directly illuminated vs. points that are not. This transformation can be modeled as a function with a binary domain and binary range:

$$f: P \Rightarrow B, \quad (7)$$

where P represents the sets of all binary projected patterns, and B is the set of all binary classifications of the acquired image. For a given pattern P∪P, this function results in a binary classification of the acquired image in which scene points that are directly illuminated under the pattern P are classified as 1, and 0 otherwise. We know that this function can be determined accurately for high-frequency patterns.

We use this idea to devise a way to determine this function accurately for low-frequency patterns. A low-frequency pattern can be represented as a logical combination, for example, a logical XOR, of two high-frequency patterns. We determine the decoding for the two high-frequency patterns, and then combine the decoded results, again using the XOR, to obtain the decoding as if under the original low-frequency pattern:

$$f(P_{lf}) = f(P_{hf}^1 \otimes P_{hf}^2) = f(P_{hf}^1) \otimes f(P_{hf}^2), \quad (8)$$

where $P_{lf}$ is the original low-frequency pattern, $P^1_{hf}$ and $P^2_{hf}$ are the two high-frequency patterns, and ⊗ is the logical XOR operator.

In practice, high frequency patterns are those patterns where the stripe width is relative small, e.g., 1, 2, 3 pixels. For low frequency patterns, the stripe width is large. For example, for 10 bit codes, the lowest frequency patterns have stripe widths of 512 pixels.

In conventional patterns, which are encoded by a single 10 bit Gray code function, the stripe width changes from 512 to 1, decreasing by a factor of 2 each time.

In general, global illumination effects can have a range of spatial frequencies. However, in practice, there are two dominant modes. Effects such defocus, sub-surface scattering leads to local blur, thus create problems for patterns where stripe width of the high frequency pattern is relatively small. If the local blur size is k, then pattern with a stripe width of k pixels are completely blurred, and not useable.

The other dominant mode is inter-reflections, which are more if the stripe width is large as in low frequency pattern. So patterns at both ends of frequency spectrum are not decoded properly in conventional structure light technique when only a single function is used to encoded the single set of patterns. Patterns which are in the middle, e.g., a stripe width of 64, can be decoded correctly in most cases. However, one can always have a pathological case where even such patterns cannot be decoded correctly.

Logical codes can be constructed from regular Gray codes in the following way. We select a high-frequency pattern as a base high-frequency pattern. For the remaining patterns, instead of projecting the original patterns, we project the logical XOR of the pattern and the base pattern. For example, if we use the last Gray code pattern (stripe width of 2 pixels) as the base pattern, all the projected patterns will have a maximum width of 2 pixels. We call these the XOR-02 codes as shown in FIG. 1C.

In contrast, the conventional Gray codes have stripe-widths up to 512 pixels. Similarly, if we use the second-last pattern as the base-plane, then we obtain the XOR-04 codes of FIG. 1D. This does not increase overhead because the number of projected patterns remains the same as for conventional codes.

Codes Resistant to Local Effects

The conventional XOR codes, while resistant to long range effects, are not suited for local effects. Local effects such as sub-surface scattering and projector/camera defocus can blur the base plane. The errors propagate to all the decoded patterns, resulting in large errors.

For handling local effects, we design codes where the minimum stripe-width (run-length) is maximized. We generate codes with low maximum run-length by considering random permutations of the conventional Gray codes and selecting the codes with a least maximum run-length. By performing such a search, we generate a code with a maximum run-length of 9.

However, the dual problem of generating codes with large minimum run-length is hard to solve with a brute-force search because these codes are much rarer. Fortunately, this problem has been well studied in the combinatorial mathematics literature. There are specific constructions available to generate codes with large minimum run-lengths.

There are specific constructions available to generate codes with large minimum run-lengths, see Goddyn et al., "Binary gray codes with long bit runs," The Electronic Journal of Combinatorics, 10, 2003, incorporated herein by reference.

Specifically, the code is a n-bit cyclic binary Gray code all of whose bit runs have length at least $n-3 \log_2 n$. That is, there exists a cyclic ordering of $\{0, 1\}^n$, such that adjacent code words differ in exactly one coordinate bit, and such that no bit changes its value twice in any subsequence of $n-3 \log_2 n$ consecutive words. Such Gray codes are 'locally distance preserving' in that Hamming distance equals index separation for nearby words in the sequence. These 10-bit "Goddyn" Gray codes have a minimum run length of 8 as shown in FIG. 1B.

For Gray codes, the maximum and minimum run-lengths are closely related. A Gray code which increases the minimum run-length also serves the dual purpose of reducing the maximum run-length. The code described above has a maximum run-length of 32. Consequently, this code, while maintaining high-depth resolution in the presence of local effects, is also more accurate for long range effects when compared to the conventional Gray codes. As with the XOR codes, the improvement in performance does not increased the number of patterns.

Automatic 3D Reconstruction System

In this section, we describe a completely automatic and robust 3D reconstruction system, which is accurate to the effects of global light transport. We consider the following three aspects of such a system: preventing errors due to global light transport effects, and detecting remaining errors, and correcting the remaining errors.

As shown in FIG. 2, a system 200 and method 250 measures 3D depth values in a scene 201 subject to global illumination 202. A projector projects (Pr) 210 multiple sets of 220 of structured light patterns 221-224 on the scene, while a camera (Ca) 230 acquires a corresponding image 231 for each pattern. The different sets of patterns are encoded according different functions, e.g., Gray, Goddyn, XOR-2, and XOR-4 code functions, respectively. The patterns can be two tone (black and white), or colored (RGB). In addition, the sets of patterns can be adapted for specific scenes and global illumination effects depending on an application. Alternatively, the patterns are adaptively modified depending on changes in the scene and the global illumination effects.

The method compares 260 depth values z for pixels at identical location pixels in the corresponding images. If at least two depth values are similar, than the depth value is returned 242. If only the Gray and Goddyn depth values are similar 243, return the Goddyn depth value 244.

If none of the depth values are similar, then mark the depth value as an error 246. Only scene points corresponding to pixel depth values in error are reprojected with the sets of patterns 220 and the errors are corrected 248. This is done by setting all projector pixels where depth has been determined successfully to off. Thus, the sets of patterns are reprojected by masking the projector pixels that where determined in the previous step. Because the masked projector pixels are off, they do not contribute to the global illumination, and the overall effect of global illumination is reduced. This process can be repeated 249 until all depth values have been recovered for all pixels, or a termination condition is reached, e.g., a predetermined number of repetitions, or the number of errors is less than some threshold.

Alternatively, a similarity between decoded projector rows of pixels, projector columns of pixels, or corresponding projector pixel locations in the plurality of sets of images at the corresponding projector pixel locations are used to mark the pixel as having the error.

The steps of the method can be performed in a processor 260 connected to memories and input/output interfaces as known in the art.

Error Prevention

Our codes prevent a large fraction of errors resulting from individual illumination effects. However, global light transport in most real world scenes is not limited to any single effect. Codes optimized for one effect cause errors in the presence of other effects. It is not straight-forward to identify which code to use without knowing the dominant error-inducing mode of light transport, which in turn requires a priori knowledge about scene geometry and material properties, or the light transport matrix. By projecting a small set of codes optimized for different effects, we can minimize the errors automatically without a priori knowledge about the scene.

Therefore, we project (Pr) 210 multiple different sets of patterns each set encoded with a different function, e.g., the XOR-04 codes, the XOR-02 codes, the Goddyn Gray codes, and the conventional Gray codes. The key idea is that the depth values determined by two different codes are consistent only if they are correct. Errors made by codes are nearly random, i.e., two different codes do not make the same error. Thus, we can determine the correct depth value by simply comparing the depth values for pixels given by the individual codes.

If any two are similar 241, i.e., a difference between the two depth values is less than some predetermine threshold v, we return 242 that depth value.

If only regular the Gray and Goddyn Gray are similar 243, then we return 244 the depth value given by Goddyn Gray code, as it is expected to have a larger depth resolution. Because the selected set of codes are optimized for different effects, the set covers a large range of effects, and hence a large class of optically challenging scenes.

Interestingly, by analyzing the errors made by the individual codes in the set, we can get qualitative scene information, such as material properties. For example, scene points where only the logical codes agree receive strong inter-reflections. On the other hand, scene points where only the two Gray codes agree correspond to translucent materials. Scene points where all the codes agree receive only a small amount global illumination.

Error Detection

It is possible that none 245 of the sets of four patterns determines a correct depth value. It is important to identify 246 such pixels where correct depth could not be estimated. The voting scheme described above provides a simple way to detect remaining errors. If for a pixel, none of the four codes agree, we mark it as an error pixel. Note that it is possible that one of the depth four values might have been correct. However, because we have an error correction stage, we take a conservative approach and classify such pixels as error pixels.

Error Correction

For extremely challenging cases, some errors might still remain. For such scenes, we adopt an iterative approach. In subsequent iterations, we illuminate 247 the scene points corresponding only to the incorrectly labeled pixels, and reconstruct 248 those points to correct the errors. Because our techniques correctly reconstruct a large fraction of the scene in the first iteration, we require only a small number of extra iterations, typically 1 or 2, for challenging scenes. Most scenes can be reconstructed without an additional iteration.

EFFECT OF THE INVENTION

We provide a system and method for preventing, detecting and correcting errors caused by global light transport for structured light based 3D scanning and shape recovery. We present a complete system, without significant overheads in terms of acquisition setup or acquisition time or post-processing. Our method can handle scenes with a wide variety of optically challenging objects and materials.

We project sets of patterns on the scene. Then, we compare errors in depth values made by individual codes in the set to obtain qualitative information about the scene.

The goal is to measure 3D scene shape in the presence of global light transport. We start by analyzing errors due to different modes of global light transport for structured light based depth recovery. Based on this analysis, we identify the properties that structured light patterns must have in order to be resilient to these errors. These properties are based on the spatial frequencies of the projected patterns. Different modes of global light transport result in different kinds of errors, thus placing different, often contrasting requirements on the projected patterns.

For instance, long range effects, such as diffuse and specular inter-reflections and diffusion produce errors for patterns with low-frequency or large-width stripes. On the other hand, local effects such as sub-surface scattering and camera/projector defocus act as low-pass filters on the incident patterns and destroy the high-frequency details.

By considering the aggregate effects of these different modes of light transport, we provide codes, which are resilient to errors resulting due to each effect individually. Global light transport in most real world scenes is not limited to any single effect.

We can obtain qualitative scene information, such as material properties such as translucent materials, heavy inter-reflections, points with a small amount of global illumination. Optimized for one effect would make errors in the presence of other effects. It is not straight-forward to identify which code to use without knowing the dominant error-inducing mode of light transport, which in turn would require a priori knowledge about scene geometry and material properties, or the light transport matrix. We show that by projecting a small set of codes optimized for different effects, we can minimize the errors without a priori knowledge about the scene or capturing the light transport matrix. By using a voting scheme, we can detect the remaining errors made by the full set of codes, as well as each code individually. Interestingly, errors made by individual codes can be used to infer a variety of qualitative scene properties, such as material properties. We also provide correction schemes for the detected errors by collecting a small number of additional images.

We show that it is not necessary to explicitly remove the global component for correct structured light decoding. In fact, in some situations, our codes actually use the global component for improving the accuracy of the decoding process. Our techniques require significantly less number of images than the explicit methods.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for measuring depth values in a scene, comprising the steps of:
   projecting a plurality of sets of patterns on the scene, wherein each set is encoded with a different function, wherein each pattern in the set has different spatial frequency, and wherein the scene is subject to global illumination effects;
   acquiring a plurality of sets of images of the scene, wherein there is one image for each pattern in each set;
   determining, for each set of images, the depth value for each pixel at corresponding locations in the sets of images to produce a plurality of depth values for each pixel at the corresponding locations;
   comparing the plurality of depth values of each pixel at the corresponding locations, and
   returning the depth value if the plurality of depth values at the corresponding locations are similar, and otherwise marking the depth value as an error, wherein the steps are performed in a processor.

2. The method of claim 1, further comprising:
   reprojecting the plurality of sets of patterns only for the pixels marked as having the error;
   correcting the errors; and
   repeating the reprojecting and correcting until all the depth values are returned, or a predetermined termination condition is reached.

3. The method of claim 1, wherein the sets of patterns includes patterns encoded according to a Gray code function, a Goddyn code function, an XOR-2 code function, and an XOR-4 code function, respectively.

4. The method of claim 1, wherein the plurality of sets of patterns include binary patterns.

5. The method of claim 1, wherein the plurality of sets of patterns include N-ary patterns.

6. The method of claim 1, wherein the plurality of sets of patterns includes continuous codes.

7. The method of claim 1, wherein the plurality of sets of patterns are horizontal, vertical, 2D or any combinations thereof.

8. The method of claim 1, wherein the depth values are determined by triangulating camera rays and a projector plane.

9. The method of claim 1, wherein the global illumination includes sub-surface scattering.

10. The method of claim 1, wherein the global illumination includes translucent illumination, or the scene includes translucent and transparent surfaces.

11. The method of claim 1, wherein the plurality of sets of patterns includes color patterns.

12. The method of claim 1, wherein the global illumination includes diffuse inter-reflections, specular inter-reflections, or a combination thereof.

13. The method of claim 1, wherein the global illumination includes diffusion and camera defocus.

14. The method of claim 1, wherein the plurality of sets of patterns depend on the scene and global illumination effects.

15. The method of claim 1, wherein the plurality of sets of patterns are adapted for specific scenes and global illumination effects depending on an application.

16. The method of claim 1, wherein the sets of patterns are adaptively modified depending on the change in the scene and global illumination effects.

17. The method of claim 1, wherein a similarity between decoded projector rows of pixels, projector columns of pixels, or corresponding projector pixel locations in the plurality of sets of images at the corresponding projector pixel locations are used to mark the pixel as having the error.

18. The method of claim 1, wherein the plurality of sets of patterns include color patterns.

19. The method of claim 1, wherein the global illumination includes diffusion and projector defocus.

* * * * *